MAGNETIC TRIGGER CIRCUIT

Filed May 25, 1961

INVENTORS
C. H. BAKER
F. S. MACKLEM
BY Roy C. Hopgood
ATTORNEY 3,201,599
MAGNETIC TRIGGER CIRCUIT
Cole H. Baker, Greenwich, and F. Sutherland Macklem, New Canaan, Conn., assignors to Ovitron Corporation, Newburgh, N.Y., a corporation of Delaware
Filed May 25, 1961, Ser. No. 112,627
7 Claims. (Cl. 307—88.5)

This invention relates in general to pulse generating circuits and in particular to circuits for triggering thyratron gas tubes, silicon controlled rectifiers, or other devices which require relatively high levels of triggering current.

One object of this invention is to provide a triggering circuit in which a relatively large triggering current pulse is generated via relatively high impedance control elements without any significant $I^2R$ power losses.

Another object of this invention is to provide a triggering circuit which is adapted to switch very rapidly from no output current to a relatively large output current in response to a relatively low voltage, low current switching signal.

A further object of this invention is to provide a triggering circuit in which the time duration of an output current pulse can be controlled in accordance with the amplitude of a switching signal derived from a relatively high impedance voltage source.

An additional object of the invention is to provide a triggering circuit which can be easily adjusted to produce any pre-determined level of output current.

Another object of this invention is to provide a magnetic triggering circuit in which a relatively small, inexpensive, high resistance saturable reactor is used to switch relatively high output currents without any significant $I^2R$ power losses.

Yet another object of this invention is to provide a magnetic triggering circuit which automatically resets itself to a pre-determined state on alternate half cycles of an A.C. power source signal and which produces output current pulses whenever its reset circuit is opened by a back-bias voltage applied to a semiconductor element in the reset circuit.

A further object of this invention is to provide a magnetic trigger circuit which is operable to produce a single output current pulse in response to a switch trigger input pulse.

Other objects of the invention will be apparent to those skilled in the art from the following description of several illustrative embodiments thereof, as shown in the attached drawings, in which.

In general terms, this invention comprises a saturable reactor element and a current switching element, such as a transistor or the like, connected to a common alternating current source in a dual current loop circuit arrangement containing a relatively low current loop and a relatively high current loop. The saturable reactor element is connected in the relatively low current loop and the current switching element is connected in the relatively high current loop. A relatively high impedance control circuit is coupled to the saturable reactor element to switch the current in the relatively low current loop, and this in turn switches the current in the relatively high current loop. This dual-loop current switching circuit allows a relatively small, inexpensive, high resistance saturable reactor element to be used in a relatively high current switching circuit without any significant $I^2R$ power losses.

In a preferred form of the invention, the saturable reactor control circuit contains automatic core reset means which normally resets the saturable reactor core to a predetermined level of magnetization on alternate half cycles of the A.C. signal in the absence of an input switching signal. When this automatic reset circuit is used, the current switching circuits are adapted to produce an output current pulse whenever the saturable reactor core is not reset. The trigger circuit is then actuated by disabling the core reset circuit when an output current pulse is desired. This automatic reset circuit shortens the response time of the magnetic trigger circuit and eliminates the need for a separate core control winding on the saturable reactor and a separate D.C. core bias supply therefor. Furthermore, the automatic reset circuit renders the magnetic trigger circuit completely fail-safe in operation.

In accordance with another basic feature of the invention, the saturable reactor element and the current switching element thereof are preferably coupled to the A.C. source via a transformer and the input switching signals for the magnetic trigger circuit, which can be either A.C. or D.C. signals, are derived directly from the A.C. source. This arrangement provides phase relationships which permit the current output pulses to extend over a full half cycle of the A.C. signal, as will be explained in greater detail below.

Figure 1:
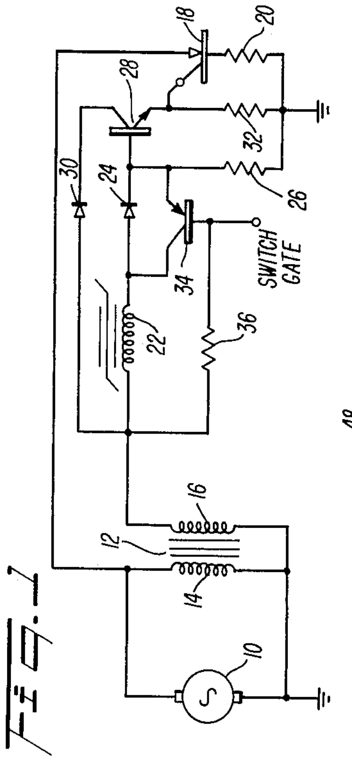
FIG. 1 is a schematic diagram of a first embodiment of the invention.

FIG. 1 shows one embodiment of the invention which contains an alternating current source 10 which is coupled to the magnetic trigger circuit through a transformer 12 which contains a primary winding 14 and a secondary winding 16. Transformer 12 is a small voltage step down transformer which reduces the voltage applied to the magnetic trigger circuit to a low level. Current source 10 is coupled directly to the anode of a silicon controlled rectifier 18, whose cathode is coupled to a load resistor 20. Silicon control rectifier 18, which can comprise any suitable prior art device, operates much in the manner of a thyratron gas tube; i.e. the rectifier 18 is non-conductive in both directions until it is energized by a pulse of current driven into its control electrode. After a pulse of current has been driven into the control electrode of rectifier 18, it will conduct current very heavily in its forward direction as long as its anode current remains above some predetermined extinguishing level. But when the anode current falls below this extinguishing level, rectifier 18 will again be non-conductive in both directions until another triggering current pulse is driven into the control electrode. As thus far described the structure is not novel in any respect, and any suitable prior art circuit elements can be used to embody structural elements 10 through 20 of FIG. 1.

Figure 7:
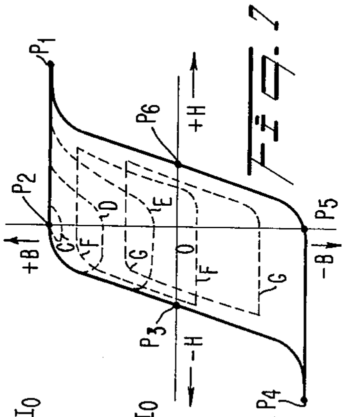
FIG. 7 is the hysteresis loop of one illustrative core material which can be used in the saturable reactor element of this invention.

The purpose of this invention is to provide current pulses of the appropriate amplitude and timing to the control element of rectifier 18. The novel magnetic triggering circuit of this invention contains a saturable reactor winding 22 which is coupled in series with a diode 24 and a resistor 26 across secondary winding 16. Saturable reactor winding 22 is preferably wound on a core material having a substantially rectangular hysteresis loop, as shown in FIG. 7, and the impedance of resistor 26 is selected to be large with respect to the D.C. resistance of saturable reactor winding 22 but small with respect to the inductive reactance of saturable reactor winding 22 at the frequency of alternating current source 10. Thus when the core of the saturable reactor is unsaturated no appreciable output voltage will appear across resistor 26, but when the core of the saturable reactor is saturated a relatively large positive going voltage pulse will be developed across resistor 26 on each positive half-cycle of the alternating current output of secondary 16. This output signal is applied to the base of an NPN transistor 28 which is coupled in series with a diode 30 and a resistor 32 across secondary winding 16. Transistor 28 is connected to act as an emitter follower which provides a current gain but no voltage gain. It will be noted that the collector voltage for transistor 28 is derived directly from secondary winding 16 through diode 30.

It can be seen that there are three parallel current loops shown in FIG. 1, each of which handles a different level of current. In the current loop which is defined by saturable reactor winding 22, diode 24, and resistor 26, the current level is very low since the only requirement of this loop is to generate base current for transistor 28. It will be appreciated by those skilled in the art that the base current requirement for a transistor is very small, and therefore the saturable reactor winding 22 and diode 24 can have relatively high D.C. resistance without producing any appreciable $I^2R$ power losses in the loop. Since the size, cost and weight of a saturable reactor are inversely proportional to its D.C. resistance, this means that the saturable reactor 22 can be adequately embodied in a relatively cheap, lightweight, compact device.

The second current loop is defined by diode 30, transistor 28, and resistor 32. The current in this loop must in general be significantly higher than the current in the first described loop in order to meet the control current input requirements of rectifier 18. It should be noted, however, that the power losses are also negligible in the second current loop because the control current flows through diode 30 and transistor 28 but not through resistor 32. Therefore resistor 32 can also be relatively high in resistance value to minimize the $I^2R$ power losses in the second current loop. Because of the very low power requirements in these two loops the voltage step down transformer 12 can also be a relatively cheap, compact, high resistance transformer.

The third current loop is a very high current loop containing the anode-cathode circuit of rectifier 18 and the load resistor 20. It should be noted here that the load element does not have to be resistive as shown in FIG. 1; it could just as well be capacitive or inductive if desired.

The circuit of FIG. 1 also contains an automatic core reset circuit comprising a PNP transistor 34 whose emitter-collector circuit is coupled in parallel with diode 24 and whose base is coupled to secondary winding 16 through a current-limiting resistor 36. Transistor 34 is connected so as to normally conduct on negative half cycles of the A.C. output from secondary winding 16. The necessary emitter-collector voltage for transistor 34 is developed across diode 24, which is back biased on negative half cycles of the A.C. signal, and the required negative base bias is taken directly from secondary winding 16 via resistor 36. With these connections transistor 34 will conduct on every negative half cycle of the A.C. signal independent of all other voltages or signals in the circuit. The current which is conducted through transistor 34 on these negative half cycles is used to reset the core of the saturable reactor to a predetermined initial bias level which will insure that the core does not saturate during the following positive half cycle of the A.C. signal. Therefore so long as transistor 34 is free to conduct on negative half cycles of the A.C. signal, no output signal will be developed across the resistor 26 on positive half cycles. If transistor 34 is disabled on the negative half cycles by a positive bias applied to its base electrode, however, the core of the saturable reactor will not be reset and it will saturate on the following positive half cycle to develop a positive going output signal across resistor 26 on that half cycle. Accordingly, the circuit can be controlled by a positive going switch gate which is applied to the base of transistor 34 during the time when an output pulse or a train of output pulses are desired. This switch gate, it should be noted, can be derived from a relatively high impedance voltage source because in the first instance the base current requirements of transistor 32 are very small and in the second instance the switch gate turns the transistor off, which reduces the current requirements even further.

The action of this auto reset-triggering circuit can be better understood with reference to FIG. 7, which shows the hysteresis loop for a characteristic saturable reactor core material. The solid loop shows the relation between flux density B and magnetizing force H for an alternating current signal which is large enough to saturate the core on both the negative half cycles and the positive half cycles of the A.C. signal. As shown in FIG. 7, the core material is driven into positive saturation at point P1 on the positive half cycle and it returns to point P2 when the positive magnetizing force drops back to zero. It will be noted that the core contains a very large amount of positive magnetism even though the magnetizing force has dropped to zero. This is called the remenant magnetism of the core, and before the core can be magnetized in the negative direction this remenant magnetism must be removed by a negative going magnetizing force. The energy used in returning the core back to the zero magnetization level is lost, of course, and this loss is called the hysteresis loss, from which the magnetization curve derives its name hysteresis loop. Thus after the positive half cycle of the A.C. signal ends, the first portion of the negative going cycle is used to return the core magnetization back to its zero level at point P3 and the remaining portion of the negative half cycle is used to drive the core into saturation in the negative direction at point P4. Then as the negative magnetizing force drops back to zero the core magnetization moves to point P5 which, it will be noted, is the remenant magnetism point for the negative value of core magnetization. On the following positive half cycle the magnetization level is first driven through zero again at point P6 and then back to positive saturation at point P1. The above described cycle is repeated endlessly as long as the A.C. signal is applied to the saturable reactor.

The above described magnetization cycle, however, is only valid when the core is driven by magnetizing forces which are large enough to saturate the core in both directions. If the magnitude of the A.C. signal is reduced, the magnetization values will follow a smaller hysteresis loop which does not reach saturation at either its upper or its lower extremes. Then if a certain amount of initial or bias magnetism is added to the core, this small hysteresis loop will be moved either upwardly or downwardly to saturate in either the positive or the negative portion of the A.C. input signal. In accordance with the prior art techniques, this bias level was applied to the core through a separate D.C. control winding on the saturable reactor, which was energized with direct current at some predetermined current value to provide the appropriate bias level in the core. In accordance with this invention, however, the bias level is automatically set to any desired level on negative half cycles of the signal input via transistor 34. Referring again to FIG. 7, assume that the magnetizing force applied to the core oscillates between point P3 and point P6 on the H axis of the graph. Consider then the case where transistor 34 is cut off during the entire negative half cycle. If the core has been driven to saturation in the positive half cycle, it will return to point P2 on the curve when the magnetizing force returns to zero. The negative half cycle which follows will be blocked by diode 24 and transistor 34, and when the next positive half cycle comes along the core will be driven into saturation immediately along the small dotted curve C surrounding P2. It will be seen that the dotted curve C swings into the negative region of the magnetizing force; this occurs because there is a certain amount of back current through diode 24 on the negative half cycle and therefore a small amount of negative magnetizing force will be applied during the negative half cycle even though transistor 34 is cut off.

Suppose now that transistor 34 is biased to conduct a small amount of current in the negative half cycle. In this case the core magnetization will be moved around the somewhat larger dotted loop D and the core will therefore saturate somewhat later in the positive half cycle that follows. If the transistor 34 is biased to conduct still more heavily in the negative half cycle, the magnetic flux will follows the dotted curve E and the core will saturate even later in the next positive half cycle. If the core is reset along curve F, however, the positive going magnetization force will not be adequate to saturate the core and the flux will follow the closed loop defined by the dotted curve F. If the transistor conducts even more heavily the flux will follow the closed curve G, which is even further removed from the saturation region of the core. Thus it can be seen that if the core is reset to an appropriate level during the negative half cycle of the input signal, it will operate in its unsaturated region during the positive half cycle which follows. If, however, the core is not reset on the negative half cycle it will be driven into saturation very early in the positive half cycle which follows, the exact time of saturation or firing angle being related to the residual magnetism of the core.

Figure 6:
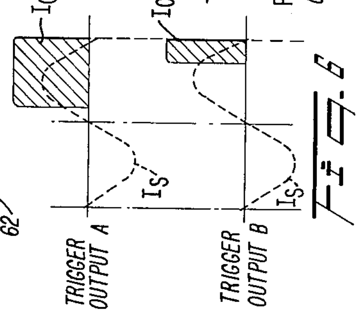
FIG. 6 is a set of waveforms showing two illustrative output current pulses which can be produced by each of the above noted embodiments of the invention.

FIG. 6 shows the output signal $I_o$ under two different firing conditions, one early in the positive half cycle of the loop current $I_s$ and the other relatively late in the positive half cycle thereof. The output firing angle can be set to any desired value between these two extremes by adjusting the reset current to the appropriate level. The wide output pulse is obtained by setting the level of the reset current somewhere between curves E and F on FIG. 7 and the narrow output pulse is derived by setting the reset curve somewhere near curve G on FIG. 7. The output pulses shown in FIG. 6 are rectangular in form, and it will be understood by those skilled in the art that rectangular pulses of this type are derived by overdriving transistor 28 so that a sine wave input to its base produces a square wave output on its emitter.

The exact value at which the core is reset in the circuit of FIG. 1 is determined by the number of turns in saturable reactor winding 22 and the reset current driven through the transistor 34. The current value is in turn controlled by the base voltage applied to transistor 32 and by the value of the series resistor 26. It will be apparent to those skilled in the art that the reset current can be set to any desired value by appropriate selection of the transistor characteristics and base voltage.

Figure 2:
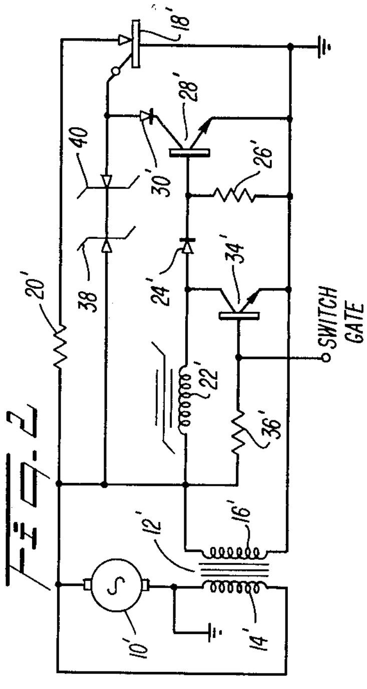
FIG. 2 is a schematic diagram of a second embodiment of the invention.

FIG. 2 shows several modifications in the basic circuit arrangement of FIG. 1. In FIG. 2 the numbers marked with a prime designate an element which corresponds both in nature and in function to the element designated by the same number in FIG. 1. In the circuit arrangement of FIG. 2, it will be noted that transistor 34′ is connected in parallel across diode 24′ and resistor 26′ so that the negative reset current flows only through the emitter-collector circuit of transistor 34′. This arrangement is slightly more economical with regard to power losses, and it allows the reset current to be adjusted independently of the output current applied to the base of transistor 28′. It will be noted too that transistor 28′ is not connected as an emitter follower but rather that it is connected as a collector follower, which produces both a current gain and a voltage gain in the output signal. The load resistor of the collector follower is formed by a pair of zener diodes 38 and 40 which are coupled back to back. These zener diodes act as load resistor and as an output voltage regulator so as to provide a constant voltage output to the control element of rectifier 18′. Except for these relatively minor differences, however, the embodiment shown in FIG. 2 operates in the same manner as described above for the embodiment of FIG. 1.

Figure 3:
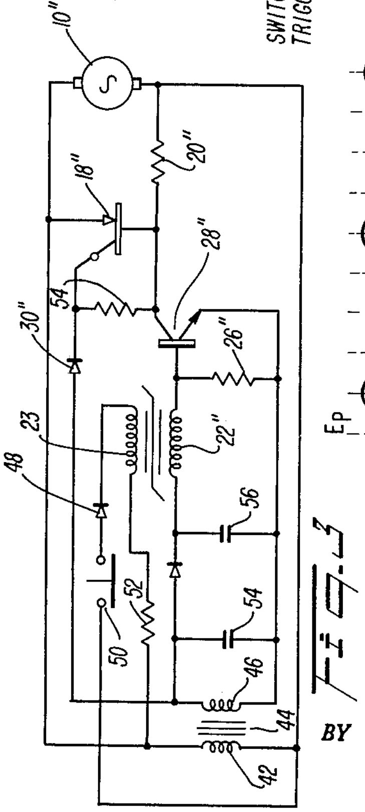
FIG. 3 is a schematic diagram of a third embodiment of the invention.

FIG. 3 shows a third embodiment of the invention which differs from the other embodiments thereof by using an independent control winding 23 on the saturable reactor core in place of an automatic reset circuit as described above. In this circuit arrangement the output signal from generator 10″ is coupled to the primary winding 42 of a transformer 44 whose secondary winding 46 applies the A.C. signal input to the magnetic trigger circuit. In addition to acting as a voltage step down transformer, transformer 44 is used in this embodiment of the invention to provide a phase shift in the A.C. signal which allows the output trigger to be adjusted in length to a full half cycle of the A.C. signal. The output of secondary winding 46 is selected to be of such amplitude as to operate the core of the saturable reactor 22 in its unsaturated region in the absence of bias current flow in the control winding thereof. The circuit is triggered by applying a D.C. bias current through control winding 23 via diode 48 and resistor 52 when relay contacts 50 are closed. This bias voltage is preferably derived from the primary voltage of transformer 44 for reasons which will be explained in detail later. The direction of the bias current is chosen to add a positive bias level to the core magnetization so that it will saturate at some time in the positive half cycle of the A.C. signal. The exact firing angle will be determined by the amount of bias current in accordance with well known prior art magnetic amplifier principles. The output trigger of this particular embodiment of the invention is also developed in a collector follower circuit, but the output thereof is taken across a resistor 54 rather than a pair of zener diodes as shown in FIG. 2.

Figure 5:
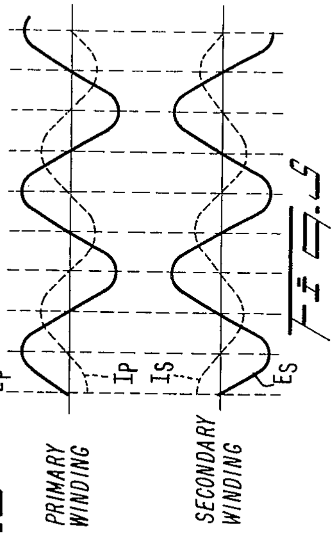
FIG. 5 is a set of wave forms showing the voltage and current phase relationships in all of the above noted embodiments of the invention.

FIG. 5 shows the phase relations between primary voltage $E_p$, primary current $I_p$, secondary voltage $E_s$, and secondary current $I_s$ of the transformers in all of the above described embodiments of the invention. In the unfired condition of the circuit, both the primary and secondary windings of the transformer will be working into a substantially inductive circuit. This means that the primary current will lag the primary voltage by approximately 90° and that the secondary current will lag the secondary voltage by approximately 90°. The secondary voltage, of course, lags the primary current by approximately 90° in any case due to the nature of the electro-magnetic induction process across the transformer. Therefore with an inductive load the secondary voltage will be approximately 180° out of phase with the primary voltage and the secondary current will be approximately 180° out of phase with the primary current. The voltages developed across the resistors 26′ and 26″ will, of course, be in phase with the secondary current and therefore for full utilization of the A.C. cycle the bias current applied to the control winding 23 of the saturable reactor should lead the secondary current. This voltage can thus be derived from the primary voltage through a current limiting resistor such as a resistor 52 which, it should be noted, can be relatively large since the control current requirements of high resistance saturable reactors are relatively modest.

When the saturable reactor is fired (becomes saturated) the load on secondary winding 46 becomes resistive in nature and the primary and secondary currents shift into phase with their respective primary and secondary voltages, which are then separated by only a 90° phase difference imposed by the electro-magnetic induction process in the transformer. The core will remain saturated until it is driven out of the saturation region by the back-current of diodes 48 and 24″ on the following negative half cycles of their respective voltage inputs. The phase relationships then shift back to the displacements shown in FIG. 5, and the core will saturate again on the next positive half cycle if contacts 50 remain closed. Each saturation of the core, of course, produces an output current pulse as described previously, the firing angle thereof being determined by the current flow through diodes 24′′ and 48, and by the characteristics of the saturable reactor. When contacts 50 are opened, the core does not saturate because the current driven through winding 22′′ is not adequate, in itself, to saturate the core. Therefore no output current pulses will be produced when contacts 50 are opened. It should be noted that the circuit of FIG. 3 is also fail-safe in operation because the bias voltage is derived from the A.C. signal source and the switching signal from a pair of normally open contacts. The firing range of the embodiment of FIG. 3 can be extended by adding a capacitor 54 in parallel with the secondary winding 46. Capacitor 54 advances the phase angle of the secondary current so that the saturable reactor can be fired very early in the positive half cycles of the A.C. signal. Capacitor 56 can be added to prevent "snap-on" of the magnetic amplifier which might otherwise occur in the circuit arrangement of FIG. 3. Snap-on is a very fast transition from the unsaturated to the saturated state in the saturable reactor core. Snap-on arises when there is a feedback path between two windings on the saturable reactor core. When the feedback reaches a critical value, the circuit reacts very swiftly due to excessive regeneration which is undesirable because it produces instability in the circuit. Capacitor 56 reduces this regeneration by filtering the rectified A.C. signal applied to saturable reactor winding 22′′ and thus stabilizes the circuit operation. The circuit will, of course, operate without capacitor 56, but under some conditions it might become unstable and therefore capacitor 56 is preferable in this embodiment of the invention.

Figure 4:
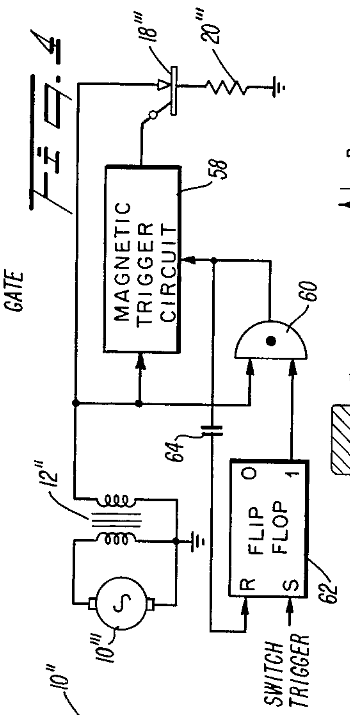
FIG. 4 is a block diagram of an input trigger circuit which can be used in combination with any of the above noted embodiments of the invention.

FIG. 4 shows a switching circuit which can be used to produce a single current output pulse in response to a relatively narrow switch trigger input. In this circuit arrangement a generator 10′′ is coupled through a power transformer 12′′ to a magnetic trigger circuit 58, which can comprise any of the above described embodiments of the invention or other embodiments not described. Generator 10′′′ is also coupled to a silicon control rectifier 18′′′ which controls the current through a load resistor 20′′′. Magnetic trigger circuit 58 applies a triggering current pulse to the control element of rectifier 18′′′ in accordance with the above described principles of operation. Instead of being triggered continuously, however, this circuit is triggered by a single positive going switch pulse developed in an AND-gate 60 which opens in response to a positive input signal on both of its input terminals and closes whenever one or the other of the two positive input signals drop to zero. One input terminal of AND-gate 60 is coupled to the secondary winding of transformer 12′′ and the other input terminal thereof is coupled to the 1 output terminal of a flip-flop 62 which gets set by a switch trigger input. When flip-flop 62 is set, a positive signal level is applied to AND-gate whereby gate 60 will open on the next positive going half cycle of the A.C. signal. When gate 60 opens it applies a positive going switch pulse voltage to magnetic trigger circuit 58 to either back-bias an auto reset transistor or actuate a relay, which then produces an output current pulse as described above. When the positive half cycle of the A.C. input signal to gate 60 ends, however, the gate closes and its closure produces a negative going transient which resets flip-flop 62 via capacitor 64 and closes gate 60 until another switch trigger input is applied to flip-flop 62. It will be understood by those skilled in the art that flip-flop 62 contains triggering diodes, not shown, and that its triggering circuit is adapted to respond only to negative going pulses on the set (S) and reset (R) input terminals thereof.

It should be noted here that due to the 90° phase lag between the secondary voltage and the secondary current, the particular trigger circuit of FIG. 4 utilizes only one half of the positive going A.C. half cycle, but that the full half of the positive going half cycle could be utilized by deriving the A.C. input to AND-gate 60 from the primary voltage of transformer 12′′ as explained previously in connection with the embodiment of FIG. 3. It should also be noted that the firing angle and the duration of the output pulse in this particular triggering circuit will be unpredictable because it is possible for the trigger input to flip-flop 62 to occur at any time during the cycle of the A.C. signal. The circuit can, however, be controlled by synchronizing the timing of the switch trigger with the A.C. signal from generator 10′′′. In this case the firing angle of the circuit would be determined by the factors described above in connection with FIGS. 1, 2, and 3.

From the foregoing description it will be apparent that this invention provides a novel magnetic triggering circuit which is adapted to generate relatively large output current pulses by means of a relatively small, inexpensive, high resistance saturable reactor element without any significant $I^2R$ power losses. It will also be apparent that this invention provides a novel magnetic trigger circuit in which a magnetic core is automatically reset to a predetermined state on alternate half cycles of an A.C. power source signal and which produces current output pulses whenever the reset circuit is disabled. And it should be understood that this invention is by no means limited to the specific structures disclosed herein by way of example. Many modifications can be made in the disclosed structure without departing from the basic teaching set forth herein, and this invention includes all modifications falling within the scope of the following claims.

We claim:

1. A magnetic trigger circuit comprising a saturable reactor containing a load winding and a ferro-magnetic core; a first diode and a first resistor coupled in series with said load winding to form a first current loop circuit; a first transistor having base, collector, and emitter electrodes, the collector-emitter circuit thereof being coupled in series with a second diode and a second resistor to form a second current loop circuit and the base electrode thereof being coupled to one end of said first resistor; an alternating current signal source coupled to said first and second current loop circuits; a second transistor having base, collector, and emitter electrodes, the collector-emitter circuit thereof being coupled in parallel with said first diode with the forward current direction of said emitter-collector circuit opposing the forward current direction of said first diode, and the base electrode thereof being coupled through a third resistor to said alternating current signal source.

2. A magnetic trigger circuit as defined in claim 1 wherein the resistance of said first current loop circuit is high with respect to the resistance of said second current loop and wherein the resistance of said first resistor is high with respect to the resistance of said load winding and low with respect to the inductive reactance of said load winding at the frequency of said alternating current signal source when said ferro-magnetic core is unsaturated.

3. A magnetic trigger circuit comprising an alternating current power source, a load element and a switching element coupled in series to said alternating current power source, said switching element having a trigger input terminal and being responsive to electrical trigger pulses applied thereto, a voltage step down transformer coupled to said alternating current power source, saturable reactor means coupled to the secondary of said transformer in a relatively high resistance current loop circuit, current control means having current input, output and control terminals, said input and output terminals being coupled to the secondary of said transformer in a lower resistance current loop circuit, said current control terminal being coupled to said relatively high resistance current loop circuit and said trigger input terminal being coupled to said lower resistance current loop circuit.

4. A magnetic trigger circuit for triggering a current switching element having a trigger input terminal and being responsive to electrical trigger pulses applied thereto, said magnetic trigger circuit comprising an alternating current power source, saturable reactor means coupled to said alternating current power source in a relatively high resistance current loop, current control means coupled to said alternating current power source in a relatively low resistance current loop circuit, said current control means having a signal input terminal and being responsive to electrical signals applied thereto, core bias means coupled to said saturable reactor means, said core bias means being operable to control the initial magnetization level of said saturable reactor and having a first state in which the saturable reactor means saturates in response to an alternating current signal from said alternating current power source and a second state in which the saturable reactor remains unsaturated, means for switching said core bias means from said first to said second state, the signal input terminal of said current control means being coupled to said high resistance current loop circuit, said current control means being operable to produce a trigger pulse in said low resistance current loop circuit in response to the first state of said core bias means, and the trigger input terminal of said current switching element being coupled to said low resistance current loop to receive said trigger pulse.

5. The combination defined in claim 4, wherein said current control means comprises a first transistor coupled in said relatively low resistance current loop circuit, and wherein said core bias means comprises a second transistor coupled in said relatively high resistance current loop circuit.

6. A magnetic trigger circuit comprising a saturable reactor containing a load winding and a ferromagnetic core; an alternating current signal source coupled to said load winding; a first diode and a first resistor having a resistance which is large with respect to the resistance of said winding and small with respect to the inductive reactance of said winding at the frequency of said alternating current signal when said core is unsaturated, coupled in series with said winding; a current control element containing a current input terminal, a current output terminal, and a current control terminal, the current input and output terminals thereof being coupled via a second diode and a second resistor to said alternating current signal source, and the current control terminal thereof being coupled to one end of said first resistor; and core bias means coupled to said ferromagnetic core, said core bias means comprising a transistor having emitter, collector, and base electrodes, the emitter-collector circuit thereof being coupled in parallel with said first diode with the forward current direction of said emitter-collector circuit opposing the forward current direction of said first diode, said bias means being operable to control the initial magnetization level in said core and being switchable between a first magnetization level in which said core remains unsaturated when current is driven through said load winding by said alternating current signal source and a second magnetization level in which said core saturates when current is driven through said load winding by said alternating current signal source.

7. A magnetic trigger circuit as defined in claim 6 wherein the base electrode of said transistor is coupled to said alternating current signal source.

References Cited by the Examiner

UNITED STATES PATENTS

| | | | |
|---|---|---|---|
| 2,998,547 | 8/61 | Berman | 307—88.5 |
| 3,019,355 | 1/62 | Morgan | 307—88.5 |
| 3,024,401 | 3/62 | Dinger. | |

JOHN W. HUCKERT, *Primary Examiner.*